United States Patent [19]

Millington

[11] 4,369,697

[45] Jan. 25, 1983

[54] SKEWER ATTACHMENT

[76] Inventor: Daniel R. Millington, 15921 Rhodolite Ct., Fountain Valley, Calif. 92708

[21] Appl. No.: 253,695

[22] Filed: Apr. 13, 1981

[51] Int. Cl.³ .............................................. A47J 00/00
[52] U.S. Cl. ................................... 99/351; 99/421 H; 99/427; 99/449
[58] Field of Search ................. 99/421 H, 419, 421 R, 99/421 HH, 421 HV, 426, 427, 349, 351, 449; 269/254 CS

[56] References Cited
U.S. PATENT DOCUMENTS

| | | | |
|---|---|---|---|
| 1,741,400 | 12/1929 | Bocchino | 99/421 H |
| 2,727,325 | 12/1955 | Jurinic | 269/254 CS |
| 3,147,690 | 9/1964 | Smith | 99/421 H |
| 3,163,103 | 12/1964 | Shoup | 99/449 X |
| 3,812,776 | 5/1974 | Kean | 99/421 H |
| 4,063,496 | 12/1977 | Kozikowski | 99/419 |

*Primary Examiner*—Billy J. Wilhite
*Attorney, Agent, or Firm*—Francis X. LoJacono

[57] ABSTRACT

An improved attachment for securing food firmly in place on a skewer or spit, as the food is rotated over the burning coals of a motorized barbecue unit. The skewer attachment comprises a pair of end plates adapted to be mounted along a typical skewer member, the end plates being positioned to press against the opposing ends of the food when the food is centrally located on the skewer. A plurality of elongated coiled spring members are arranged either singularly or intertwined to be spirally wrapped about the food and secured at each opposite free end thereof to the respective end plates.

5 Claims, 4 Drawing Figures

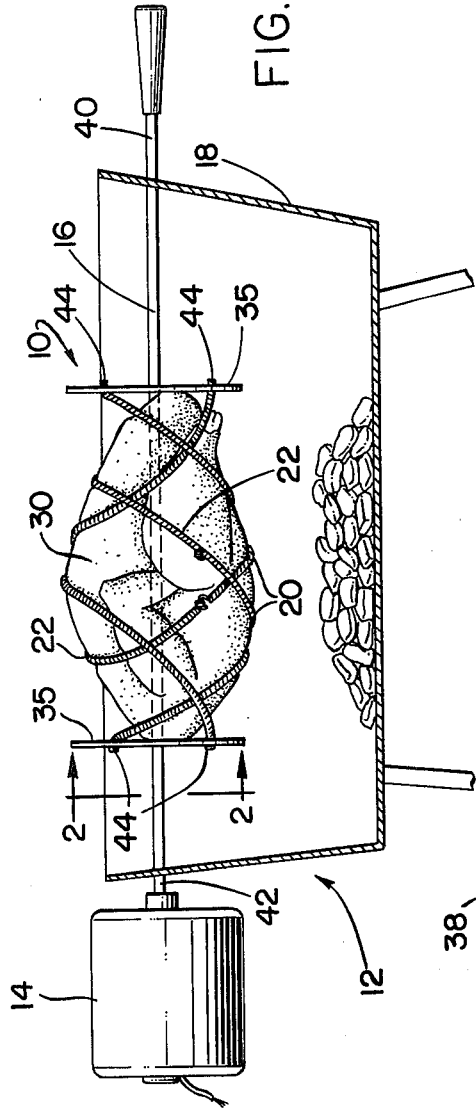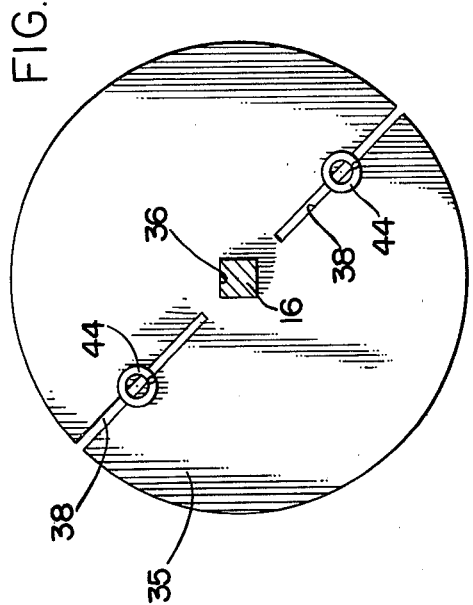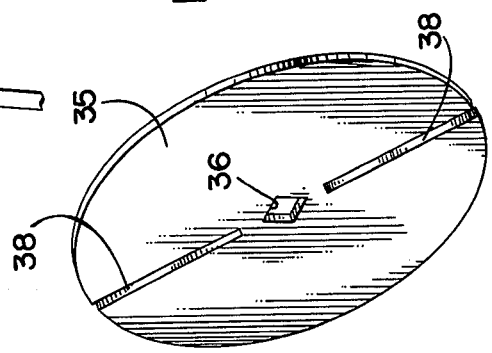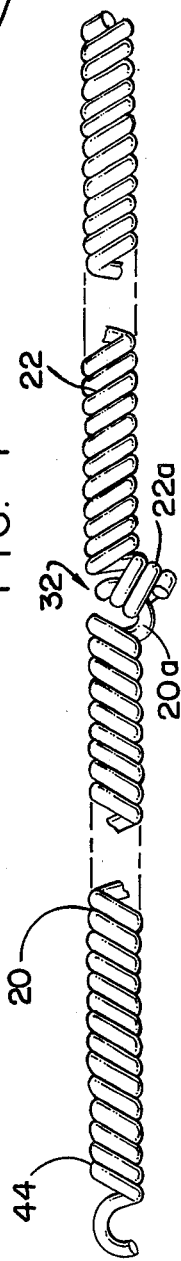

SKEWER ATTACHMENT

BACKGROUND OF THE INVENTION

1. Field of the Invention

This invention relates to cooking utensils, and more particularly to an improved skewer attachment for firmly securing food to the rotating skewer of a barbecue unit, in order to provide more efficient cooking of the food.

2. Description of the Prior Art

It is well known in the art that several problems and difficulties are being encountered in providing suitable means for securing food in a positive manner to a rotatable skewer or spit member.

For many years, there have been various types of cooking spits used to secure a variety of foods in order that they may be cooked from heat generated by open fires, gas and electric ovens, and other cooking apparatuses. Possibly, the most popular cooking method utilizing skewers is barbecuing. In barbecuing, the pointed extremity of the skewer is used to pierce the opposing ends of food. The skewer may then be mounted on a holder device which remains stationary during the cooking process.

Obviously, unless someone is in attendance to rotate the skewer, the food will become overdone on its fire-facing side and underdone on the opposing side. In order to eliminate the need for manual rotation of the skewer, various devices are available which rotate the skewer automatically upon actuation of an appropriate motor. Unfortunately, with either the manual or the mechanical rotation of the skewer, when food shrinks during cooking it becomes loosened from the skewer and frequently does not rotate with the skewer. When this occurs, the food becomes overdone on the fire-facing side and underdone on the opposing side.

A variety of devices have been devised to attempt to secure food to a skewer during the barbecue cooking process, the most popular of which is the use of two multiple-pronged forks which pierce the opposing ends of the food and are attached to the skewer by means of collars, each having a radial bore in order to receive wing screws which—when tightened—secure the device to the skewer. Three major problems occur with the pronged forks. Although initially they secure some foods to the skewer when the food cooks, shrinking takes place and the prongs tend to release their hold on the food to the extent that, finally, the food—no longer secure on the skewer—does not rotate with the skewer and, alas, the same old problem (burnt on one side and underdone on the other). Another problem is the fact that anytime meat is pierced the natural juices tend to escape. The nutritional value as well as the flavor and texture thus are dissipated. Another important drawback of the pronged-fork devices is that they lack the versatility of securing many foods to a skewer because of the arrangement of the forks. For instance, any food having a diameter smaller than that of the prongs on the fork cannot be secured or it is extremely difficult to do so.

In order to alleviate the above-mentioned problems, various cage or basket-type devices have been devised—such as in U.S. Pat. Nos. 1,741,400 and 3,812,776. Although these holding devices somewhat relieve the problem of adequately fastening food to a skewer during the cooking process, they fail to hold food securely as it shrinks during cooking. Additionally, although the above-mentioned patents have a certain degree of flexibility as to the foods they can accommodate, this flexibility is limited.

SUMMARY AND OBJECTS OF THE INVENTION

The general purpose of the present invention is to provide a cooking utensil that is compatible for use with barbecue skewer and spit devices, and that is adapted to provide a means for firmly securing food thereon so as to insure a positive rotation of skewer-supported food. The attachment includes a pair of end plates and a plurality of coil-spring members. The springs are stretched and coiled about the food and connected at their free ends to each end plate. Since the elements of the attachment device do not penetrate the food when in a holding or securing action, the retention of the natural juices is enhanced in the cooking process.

Therefore, it is an object of this invention to provide barbecued food which has greater nutritional value, and improved texture and flavor.

A still further object of the invention is to provide a device of this character that does not require tools of any kind in the positioning and securing of the food to the skewer.

A further object of this invention is to provide a device whereby a greater variety of foods may be securely fastened to a barbecue skewer or spit. For example, the same utensil can hold an eight-pound roast as well as a two-ounce wiener or hot dog.

Another object of this invention is to provide a flexible holding utensil that has the ability to secure foods in a positive manner to a barbecue skewer or spit, regardless of the amount of shrinkage of the food during the cooking process, thus preventing charring and drying out of the food.

An additional object of this invention is to provide a means of barbecuing small pieces of food—such as shish kebob consisting of small bite-sized chunks of meat, poultry, fish and vegetables—which must be placed upon a small skewer and which heretofore had to be manually rotated because the ordinary barbecue motor would not accommodate such a small skewer. The present invention provides a means whereby the holding members graspingly attach the small skewer to the larger skewer, which is rotated automatically by a motor. In this application, the advantages are two-fold. One, the barbecue attendant is relieved of the task of manually rotating the small spit; and two, since the small spit is rotated automatically and uniformly, the food is cooked more efficiently and is more appetizing.

Still another object of this invention is to provide a device that enables ordinary springs to be secured in an extended position to establish enough force to secure the food in the preselected position until cooking is completed.

It is still another object of the invention to provide a device of this type that has relatively few parts, making it simple to operate and maintain.

Still a further object of the invention is to provide an improved skewer attachment of this type that is relatively inexpensive to manufacture.

In summary, the object of this in invention is to provide an improved skewer attachment whereby a much greater variety of foods may be barbecued on a motorized skewer than heretofore possible; whereby the food is cooked much more efficiently, with little effort; and whereby the finished food product is far superior in taste, texture and nutritional value.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a longitudinal cross-sectional view of a barbecue unit illustrating the present invention as it is employed therewith to secure food to the rotating skewer;

FIG. 2 is an enlarged cross-sectional view taken substantially along line 2—2 of FIG. 1, wherein the end plate is mounted to the skewer and the free ends of each spring are shown coupled to the radial slots formed in the end plate;

FIG. 3 is a perspective view showing the arrangement of each end plate; and

FIG. 4 is a side-elevational view of at least two spring members that are interconnected at their ends.

DESCRIPTION OF THE PREFERRED EMBODIMENT

Referring to FIG. 1, there is illustrated one embodiment of the present invention which is in the form of an improved skewer attachment, generally indicated at 10, and is associated with a typical motorized barbecue unit, designated at 12, having a motor 14 and a skewer or spit member 16 which—when supported in the barbecue housing 18—is rotated by motor 14 in the well known manner.

The improved skewer attachment 10 comprises a plurality of coil-spring holding members 20 and 22. Each spring member is composed of a coiled or spiraled spring which defines a longitudinal stretchable means capable of withstanding the heat generated during barbecuing.

These springs may be used individually or jointly, depending upon the size and type of food to be barbecued. That is, when a small piece of meat is to be cooked, one spring is coiled or wrapped about the meat in one direction, and a second single spring member is wrapped or coiled about the meat in the opposite direction. However, if the meat is a large piece (such as a turkey shown at 30), several spring members are interconnected at 32 by their free ends, as shown in FIGS. 1 and 4, forming an additional large spring. This is accomplished by placing together the free ends 20a and 22a of the respective springs 20 and 22, and rotating them counter-clockwise a few revolutions. Thus, depending upon the size of the food 30 or the length of each spring-holding member, the spring-holding members may be used individually or jointly to secure the food in a fixed relationship with the barbecue skewer 16. However, it should be understood that at least one pair of stretchable means must be employed, each being wrapped about food 30 in different everlapping directions.

To enable the food to be further held in a central position in a fixed manner by skewer 16, there is provided a pair of end plates 35 which are oppositely arranged to abut against the opposing ends of food 30, as seen in FIG. 1. The plates 35 are formed as identical circular discs approximately 1/40 of an inch in thickness, with a diameter of approximately 3½ inches. Each disc includes a centrally disposed square hole 36 which is adapted to be slidably mounted on skewer 16, the hole being of any suitable size—although 5/16 of an inch is the general size opening for most skewers which have a square cross-section.

Accordingly, each disc or end plate 35 includes at least one pair of radially disposed slots 38. The slots are oppositely arranged from each other, as seen in FIGS. 2 and 3, and have a width suitable to receive the coil-spring members therein.

It can be well understood that many different types of food may be cooked in the manner provided by the present invention. However, for simplicity, a turkey will be referred to throughout the following description of the operation of the present invention.

Utilizing an ordinary barbecue skewer 16, the receiving end 40 is inserted in the square hole 36 of one of the end plates and is positioned adjacent the motor-receiving end 42 of skewer 16. Because of the configuration of skewer 16 and the matching center square hole of the two discs, radial movement of the discs is prevented.

At this time, the length of the spring is determined. If two sections are required, they are interconnected as described—one free end 44 being stretched slightly so as to be inserted into one of the radial slots 38. Then, two other coil-spring members are interconnected, as at 32—one free end being inserted in the opposite slot 38 of the first plate. The turkey is next carefully impaled by the skewer so that the pointed tip of the skewer is inserted into the center of the turkey which is positioned on the skewer 16 so that it abuts against the first plate. When this is accomplished, the second plate is positioned on the skewer in the same manner as above so that it abuts against the opposite end of the turkey. Thereafter, the first pair of coil-spring holding members are wound around the turkey in a clockwise rotation, so that the turkey is fixedly held and secured to the skewer 16. The opposite free end of the paired coil-spring members is stretched to be received into the first slot 38 of the second plate 35. Then, the second pair of coil spring holding members are wound around the turkey in a counter clockwise rotation, so that the turkey is graspingly held and firmly secured between the end plates 35 by attaching the free end of the second coil spring to the remaining slot 38 of the oppositely positioned plate. The skewer 16 is then inserted into the appropriate motor apparatus 14 in the manner well known in the art. Upon actuation of motor 14, skewer 16 rotates and causes the turkey 30 to turn with the skewer, since the turkey is firmly held in place by the grasping force of the coil-spring holding members which are evenly spiraled around the turkey, as seen in FIG. 1.

It is to be noted that as the food shrinks during the cooking process the spring members will adjust themselves, so as to apply a continuous grapsing force about the food.

Since the present invention does not require the puncturing of the food to be cooked, as is the case with many of the skewer food attachments, the loss of natural juices is minimized.

The foregoing describes one method of utilizing the present invention; but it is to be understood that there are other embodiments and adaptations of the improved skewer attachment 10 which are peculiar only to the present invention. For example, the barbecuing of a shish kebob can be more efficiently accomplished by employing the present invention. An ordinary shish-kabob consists of bite-sized pieces of meat, fish, or poultry, and small pieces of vegetables—all of which are generally too small to be pierced by the average barbecue skewer. Therefore, typically a considerably smaller skewer is utilized which cannot be disposed into an ordinary barbecue motor attachment for rotation. Substituting the small shish kebob skewer for a roast and employing the exact procdures in the utilization of the present invention, the shish kebob can be automatically rotated during the cooking process. It should be further recog understood that additional spring connecting slots can be added to plate 35, if more spring-holding members are required for supporting particular foods.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. An improved attachment for securing a food product firmly in place on a rotatable skewer for barbecuing and the like, comprising:
   a first end plate adapted to be received and positioned on said skewer so as to rotate therewith;
   a second end plate adapted to be received and positioned on said skewer so as to rotate therewith, whereby said food product is interposed between each end plate;
   said end plates being defined by a disc including a central hole having a configuration compatible with that of said skewer, to prevent lateral movement of said disc on said skewer;
   means for firmly securing said end plates against said food product and firmly engaging said food product as said food product rotates relative to said rotating skewer;
   wherein said securing means comprise a plurality of longitudinal stretchable members having free ends adapted to be removably connected to said end plates, and wherein said end plates include connecting means thereon;
   wherein said connecting means comprise a plurality of radially extended slots formed in each of said plates.

2. An improved attachment as recited in claim 1, wherein a pair of slots are oppositely disposed, and are aligned with each other and said central hole therein.

3. An improved attachment as recited in claim 2, wherein said longitudinal stretchable members are defined by a pair of coiled-spring holding members wherein the free ends thereof are attachable to said radial slots in said end plates, and wherein each of said coil-spring holding members are spiraled about said food in different directions from each other, to firmly grasp said food in a fixed position during the cooking process.

4. An improved attachment as recited in claim 3, wherein a first coiled-spring holding member is interconnected to a second coiled-spring holding member, in order to extend the length thereof.

5. An improved attachment as recited in claim 2, wherein said longitudinal stretchable members comprise:
   a first pair of coiled-spring holding members interconnected to each other, each free end thereof being attachable to said respective slots in opposing end plates; and
   a second pair of coiled-spring holding members interconnected to each other, each free end thereof being attachable to said remaining respective slots in said opposing end plates;
   said first pair of coiled-spring holding members being wrapped about said food in a clockwise direction, and said second pair of coiled-spring holding members being wrapped about said food in a counterclockwise direction.

* * * * *